United States Patent
Zobel et al.

(10) Patent No.: US 6,832,643 B1
(45) Date of Patent: Dec. 21, 2004

(54) COOLING SYSTEM, ESPECIALLY FOR A VEHICLE

(75) Inventors: Werner Zobel, Böblingen (DE); Michael Ehlers, Nagold (DE); Frank Vetter, Filderstadt (DE); Jörg Soldner, Ehningen (DE)

(73) Assignee: Modine Manufacturing Company, Racine, WI (US)

( * ) Notice: Subject to any disclaimer, the term of this patent is extended or adjusted under 35 U.S.C. 154(b) by 273 days.

(21) Appl. No.: 09/672,429

(22) Filed: Sep. 28, 2000

(30) Foreign Application Priority Data

Oct. 21, 1999 (DE) .......................... 199 50 754

(51) Int. Cl.[7] .......................... B60H 3/04; B60K 11/06; B60K 11/08; F01P 1/06
(52) U.S. Cl. .......................... 165/41; 165/51; 165/125; 165/140; 165/916; 123/41.49; 123/563
(58) Field of Search .......................... 165/125, 41, 51, 165/140; 123/41.49, 563

(56) References Cited

U.S. PATENT DOCUMENTS

| | | | |
|---|---|---|---|
| 2,368,732 A | * | 2/1945 | Wallgren |
| 3,642,062 A | * | 2/1972 | Edmaier .................. 165/125 |
| 3,800,866 A | * | 4/1974 | Ireland et al. ............. 165/125 |
| 3,868,992 A | * | 3/1975 | Getz et al. ................ 165/51 |
| 3,921,603 A | * | 11/1975 | Bentz et al. .............. 165/51 |
| 3,978,919 A | * | 9/1976 | Fachbach et al. .......... 165/125 |
| 4,202,296 A | | 5/1980 | Nonnenmann et al. .. 123/41.49 |
| 4,317,439 A | * | 3/1982 | Emmerling ................ 123/563 |
| 4,357,914 A | * | 11/1982 | Hauser ..................... 165/125 |
| 4,377,203 A | * | 3/1983 | Ejima ...................... 165/125 |
| 4,730,669 A | * | 3/1988 | Beasley et al. ............ 165/151 |
| 5,188,193 A | * | 2/1993 | Schroeder .................. 180/242 |
| 5,522,457 A | | 6/1996 | Lenz ....................... 123/41.49 |
| 6,129,056 A | * | 10/2000 | Skeel et al. ................ 165/41 |
| 6,164,909 A | * | 12/2000 | Ehlers et al. .............. 165/41 |
| 6,564,857 B1 | * | 5/2003 | Zobel et al. ................ 165/41 |

FOREIGN PATENT DOCUMENTS

| | | | | |
|---|---|---|---|---|
| DE | 2716997 | * | 10/1977 | |
| DE | 2716997 B2 | | 3/1979 | |
| DE | 3148942 C2 | | 12/1983 | |
| DE | 29504867 | * | 7/1996 | |
| DE | 19724728 A1 | * | 2/1999 | ............. F01P/1/06 |
| GB | 2065860 | * | 7/1981 | |
| WO | WO 98/45600 | * | 10/1998 | |

* cited by examiner

*Primary Examiner*—John K. Ford
(74) *Attorney, Agent, or Firm*—Wood, Phillips, Katz, Clark & Mortimer

(57) ABSTRACT

Optimization of the efficiency of a compact cooling system for air cooling of at least two different heat exchange fluids is obtained in a construction including three heat exchangers (10), (12), (14) arranged in a housing-like shape with an open center. A radial fan (44) is located within the housing and is rotatable about an axis (42). A front panel (36) having an air inlet (38) on the axis (44) abuts a corresponding one of the opposed sides (26), (62) of each of the heat exchangers while a rear panel abuts the other of the opposed sides (64) of each of the heat exchangers (10), (12), (14) and journals the fan (44) for rotation about the axis (44). The assembly is characterized by the fact that the core width "$W_c$" of one of the heat exchangers (10) is greater than that of another of the heat exchangers (14) such that one or both of the opposed sides (62), (64) of the one heat exchanger projects forwardly and/or rearwardly of a corresponding one or both of the opposed sides (26), (64) of the heat exchanger (14).

7 Claims, 2 Drawing Sheets

COOLING SYSTEM, ESPECIALLY FOR A VEHICLE

FIELD OF THE INVENTION

This invention relates to cooling systems, and more particularly, to cooling systems for utilization on vehicles where plural, different heat exchange fluids require cooling.

BACKGROUND OF THE INVENTION

So-called "compact cooling systems", especially for vehicular applications, are being investigated at an ever increasing rate. Typically, they have several heat exchangers which are positioned to define a housing. Within the housing thus defined is the impeller of a radial fan. The front of the housing is closed but includes an inlet nozzle facing the impeller and the rear wall of the housing is also closed. The impeller draws fresh air into the housing through the nozzle and expels the same radially outwardly, as cooling air, through each of the heat exchangers. Typically, the rear wall of the unit provides a journal for the impeller. Certain of the heat exchangers may be devoted to cooling the coolant of an internal combustion engine while another may be utilized to cool combustion air from the engine after it has had its pressure increased by a turbocharger or the like. Still another may be utilized as a condenser or gas cooler in an air conditioning system for the vehicle and still another may be utilized as an oil cooler for oil in vehicular systems that requires cooling, particularly, transmission oil.

One example of such an apparatus is described in European Patent Application No. [9910760.9, the entire disclosure of which is herein incorporated by reference] 99107601.9.

Other apparatus with some similar features are also shown in U.S. Pat. No. 4,202,296 and German Patent 3148942C2. The apparatus of the two identified patents do not relate to casing-like configurations as alluded to above wherein several individual cooling units are employed. Rather, they relate to so-called "ring-type" cooling units which are more expensive to produce and consequently have not seen wide spread use as of the present. In the case of both, radial fans rotatable about a vertical axis have been employed but such a position is not particularly advantageous in terms of the efficiency of the fan.

Still another example of a ring-type cooling unit is shown in German Patent DE AS2716997 which does have the advantage of cooling several different cooling mediums. However, the cost of manufacturing a cooling system according to this patent is quite expensive.

One concern in compact cooling systems of the sort alluded to previously wherein different heat exchange fluids require cooling resides in the fact that because various ones of the heat exchangers are cooling different heat exchange fluids, to maximize efficiency, it is desired to provide only so much cooling air to each heat exchanger as is required to meet the maximum loading of the system having the heat exchange fluid which a given heat exchanger is to cool. That is, it would be desirable to balance the air flows through the respective heat exchangers according to the heat exchange capacity required of each so that excessive air flow through one or more heat exchangers not requiring that rate of air flow is avoided. Specifically, with each heat exchanger, and the associated flow of cooling air therethrough, a certain amount of fan energy will be required. Since the fans are typically driven by a mechanical connection to an internal combustion engine or by an electric motor receiving energy from a generator or alternator driven by the engine, the use of larger than needed air flows translates into increased fuel consumption which is to be avoided.

The present invention is intended to provide a means whereby air flows may be matched with the system requirements of each heat exchanger.

SUMMARY OF THE INVENTION

It is the principal object of the invention to provide a new and improved cooling system, particularly for a vehicle. More specifically, it is an object of the invention to provide a so-called compact cooling system wherein a plurality of heat exchangers are arranged to create a housing in which a radial fan is disposed and wherein the heat exchangers and the housing may be configured so that the cooling air flows through each of the plurality of different heat exchangers operating on different heat exchange fluids may be optimized to increase system efficiency.

An exemplary embodiment of the invention achieves the foregoing object in a cooling system for air cooling a plurality of at least two different heat exchange fluids. The system includes a plurality of at least three heat exchangers, each having a core with opposed ends, opposed sides extending between the ends and spaced from one another by a core width, spaced headers, one at each end of each core, and an inlet face and an outlet face spaced from one another by a core depth. The heat exchangers are arranged in adjacency in the configuration of a polygonal solid with their inlet faces located radially inward of their outlet faces and with each header in substantial abutment with a header of one of the other heat exchangers to define an open center housing. A radial fan is disposed within the housing and is rotatable about an axis. A front panel having an air inlet on the axis abuts a corresponding one of the opposed sides of each of the heat exchangers and a rear panel is provided abutting the others of the opposed sides of each of the heat exchangers as well as serving as a mounting point for journaling the fan for rotation about the axis. The core width of one of the heat exchangers is greater than that of another of the heat exchangers such that one or both of the opposed sides of the one heat exchanger projects forwardly and/or rearwardly of a corresponding one or both of the opposed sides of the other heat exchanger or heat exchangers. Thus, the inlet face area of each heat exchanger may be selected to provide a desired, and balanced air flow to minimize fan power requirements and thereby increase system efficiency.

In a preferred embodiment, the one heat exchanger has a core depth that is different from the core depth of the other heat exchanger to further assist in balancing air flow.

In a preferred embodiment, the configuration includes a top side defined by the one heat exchanger and the one heat exchanger is a charge air cooler for an internal combustion engine.

In one embodiment, the one heat exchanger projects forwardly of the air inlet on the front panel and the front panel includes a beveled surface located between the air inlet and the one of the opposed sides of the one heat exchanger abutted by the front panel.

Preferably, the one of the opposed sides is imperforate and defines part of the front panel.

A highly preferred embodiment of the invention contemplates that one or both of the front and rear panels includes a bend extending respectively to the one or to both of the opposed sides of the one heat exchanger.

Other objects and advantages will become apparent from the following specification taken in connection with the accompanying drawings.

DESCRIPTION OF THE PREFERRED EMBODIMENT

It is to be noted that the following description of the invention refers to the environment of vehicular applications. However, no limitation to vehicles is intended except insofar as expressed in the appended claims. For example, the system may be utilized with efficacy in connection with internal combustion engine system cooling systems or stationary applications as, for example, electrical generators. Moreover, the same may be used in non-internal combustion engine applications where there is a need for a single cooling unit to provide cooling for multiple, non-compatible heat exchange fluids that require cooling. With the foregoing in mind, an exemplary embodiment of the invention will now be described with reference to FIGS. 1 and 2.

Figure 1:
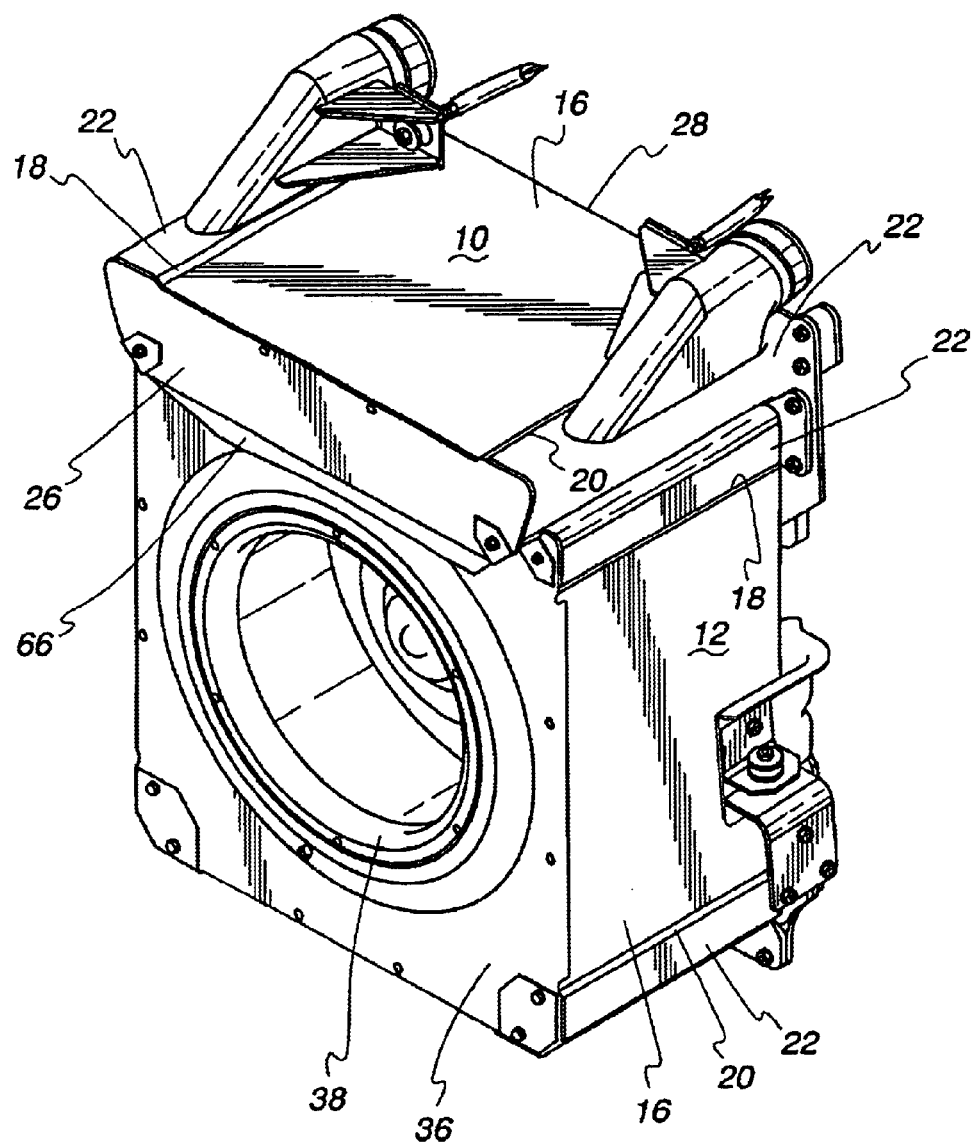
FIG. 1 is a perspective view of a cooling system module made according to the invention.

An exemplary embodiment of a compact cooling system made according to the invention is illustrated in FIG. 1 and is seen to include a rectangular array of four heat exchangers 10, 12, (only two of which are shown in FIG. 1). The upper heat exchanger is,shown at 10 while a side heat exchanger is shown at 12. An otherwise identical heat exchanger to the heat exchanger 12 is located oppositely of the heat exchanger 12 while still another heat exchanger, which may be different from all of the others, is located at the bottom. Such a heat exchanger is shown at 14 in FIG. 2.

Each of the heat exchangers 10, 12, 14, and those not shown, includes a core made up of tubes and fins as is conventional. Alternatively, one or more of the cores 16 may have conduits other than tubes as, for example, metal stampings bonded together in spaced relation and frequently referred to as "drawn cups".

Each of the cores 16 has an end 18 and an opposed end 20 to which headers 22 are fitted. The headers are abutted as illustrated in FIG. 1 and held in place in such a way that essentially no air may pass between the headers at their points of abutment. As a consequence, an open housing-like structure having an open center 24 (FIG. 2) results.

Each of the cores 16 also includes opposed sides 26, 28 which are spaced apart a distance that may be referred to as the core width. The core width is given the designation "$W_c$" in FIG. 2, for example.

Each of the cores further includes an inlet face 30 which is disposed on the radially inner side face of the configuration facing the open center 24. An outlet face 32 is on the radially outer side of each heat exchanger 10, 12, 14 in relation to the open center 24.

Figure 2:
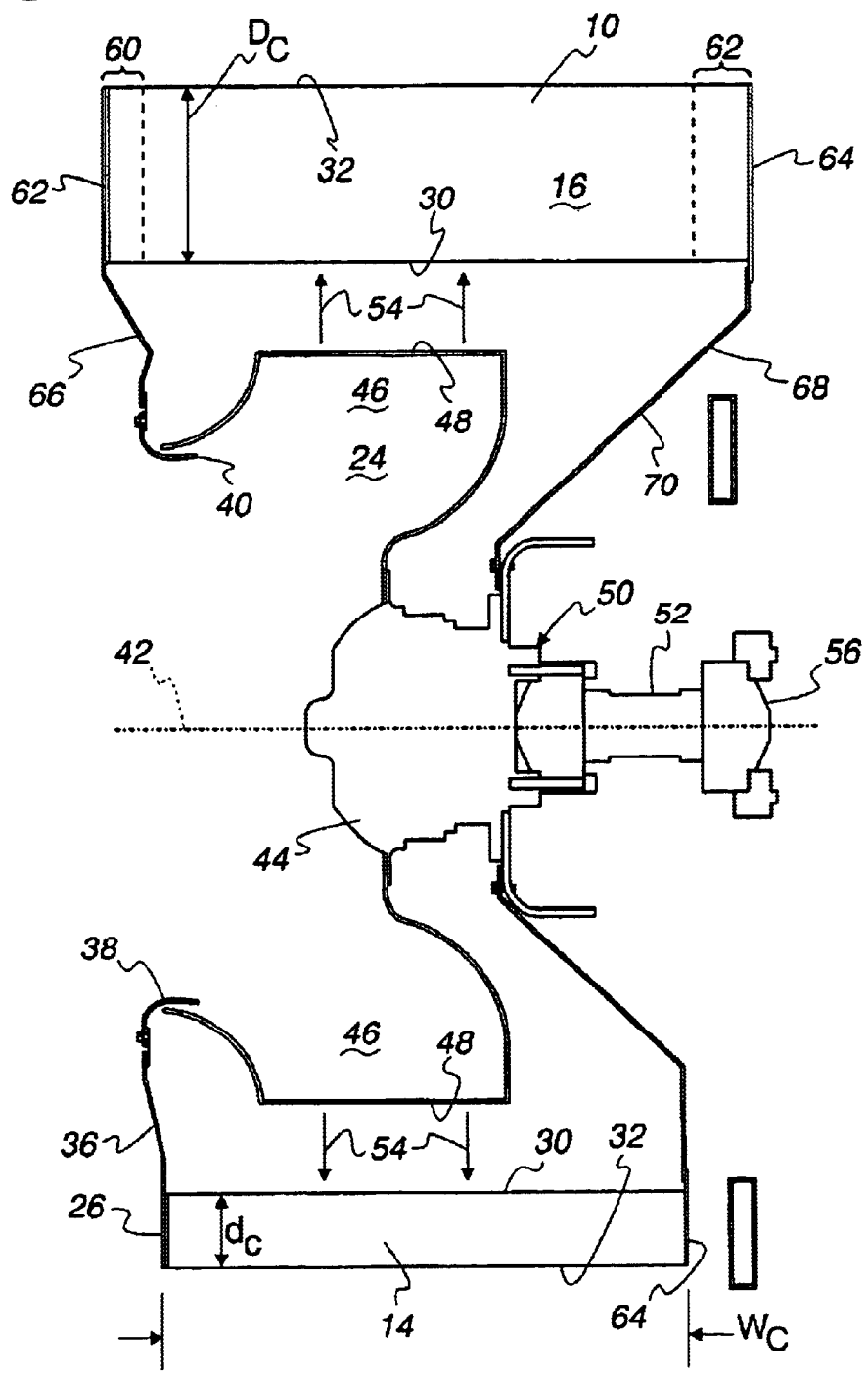
FIG. 2 is a sectional view of the module.

The inlet faces 30 and outlet faces 32 are spaced from one another by a distance shown, for example, in FIG. 2 by the designation "$D_c$" for the heat exchanger and at "$d_c$" for the heat exchanger 14. The height of each core 16 is not designated as such in the figures but is the distance between the headers 22 of each core 16 forming one of the heat exchangers 10, 12, 14. Thus, it will be appreciated that the frontal area of each of the cores 16 of the heat exchangers 10, 12, 14 is the mathematical product of the core height and the core width "$W_c$".

The compact cooling system also includes a front wall 36 having an opening 38 in which is located a nozzle 40. The opening 38 and the nozzle 40 are generally circular and are centered on the rotational axis 42 of an impeller 44 for a radial fan having a plurality of blades 46 with discharge edges 48. A suitable bearing assembly, generally designated 50, journals the impeller 44 and a drive shaft 52 connected thereto for rotation about the axis 42. Thus, the radial fan just described is located within the open center 24 of the configuration and the blades 46 and their edges 48 discharge air drawn from the inlet nozzle 38 in the direction of arrows 54 radially outwardly toward the inlet faces 30 of the heat exchangers 10, 12, 14. Desirably, the shaft 52 includes a coupling 56 whereby the same may be connected to an electric motor or to a drive sheave or other transmission extending to the main shaft of an internal combustion engine.

For a given pressure drop across a heat exchanger core 16, at a given air flow rate, typically given in standard cubic feet per minute, air flow will be determined by the size of the frontal area of the core 16 as defined previously as well as by core depth "$D_c$" or "$d_c$" as well as that part of the frontal area that is blocked by tubes or plates defining conduits and the fins between such tubes or conduit and the density of such fins. Those skilled in the art readily recognize how these parameters interrelate to affect air flow. Further, the heat exchange capacity of a given heat exchanger will likewise be affected by these factors as well as the flow rate of air passing through the particular heat exchanger.

As noted previously, in systems of this sort it is typical that at least two different heat exchange fluids be cooled by air entering the inlet opening 38. For example, the heat exchanger 10 may be a charge air cooler for cooling engine combustion air after its pressure has been elevated by a turbocharger or a supercharger or the like. The heat exchanger 12, and the heat exchanger not shown on the opposite side of the configuration in FIG. 1, may be paired by appropriate conduits and serve as radiators for cooling the coolant for an internal combustion engine. The heat exchanger 14 (FIG. 2) may be utilized, for example, as a condenser or gas cooler in an air conditioning system. Alternatively, it may be employed as an oil cooler for cooling, for example, the transmission oil of a vehicle.

In any event, the heat rejection capacities of each of the heat exchangers will be dependent upon the use to which it is put, that is, whether it be acting as a radiator for cooling engine coolant, as a charge air cooler for cooling combustion air, a condenser or gas cooler for air conditioning purposes and operating on a refrigerant, or a transmission oil cooler for cooling transmission oil. Thus, it is necessary that each of the heat exchangers be sized in accordance with the heat rejection requirements of the system with which it is associated and typically this means that the heat exchangers may be of different sizes, have different fin densities, etc. as alluded to previously. Moreover, it is necessary that each heat exchanger pass a sufficient volume of air to achieve the desired heat rejection capacity without contributing to excessive pressure drop in the system.

To this end, both core depth and frontal area are varied to achieve the desired result of balanced air flow that is optimum for each of the heat exchangers. In some cases, this will mean an increased core depth. Thus, FIG. 2 shows the charge air cooler 10 having a core depth "$D_c$" that is considerably greater than the core depth "$d_c$" of the heat exchanger 14. Similarly, the core depth of the heat exchanger 12 may be different from either. Furthermore, the core width "$W_c$" of each of the heat exchangers may be varied appropriately. FIG. 2 shows an embodiment where the core width "$W_c$" of the heat exchanger 10 is greater than that of the heat exchanger 14. So much so that the heat exchanger 10 has a section 60 as shown in FIG. 2 that projects forwardly of the corresponding side of the heat exchanger 14. A similar section 62 projects rearwardly of the other opposed side 64 of the heat exchanger 14.

To accommodate this, the front panel 36 includes a beveled section 66 that is located between the inlet 38 and the forward opposed side 62 of the heat exchanger 10. Similarly, a bend or bevel 68 is disposed in the rear wall 70 of the system which also contacts and seals against each of the opposed sides 64 as well as mounts the journal 50 for the impeller 44.

Preferably, the side walls 26, 62 and 64 are imperforate and thus may serve as extensions of the front panel 36 and the rear panel 70.

As a result, by appropriately manipulating variables including air free flow area through each of the cores 10, 12, 14, fin density, core depth, and core frontal area, one may size each of the heat exchangers 10, 12, 14 so that for a given pressure drop, only the optimal volume of air will flow through that particular heat exchanger and still achieve the desired heat rejection for the system with which the heat exchanger is involved. The changes in frontal area may be readily accommodated through the use of the bevels 66, 68, and by, where necessary, varying the core height, that is, the distance between the headers of a given heat exchanger, as required.

As a result, a cooling system made according to the invention optimizes system efficiency and minimizes fan power requirements.

We claim:

1. A cooling system for air cooling a plurality of at least two different heat exchange fluids comprising:

a plurality of at least three heat exchangers, each having a core with opposed ends, opposed sides extending between said ends and spaced from one another by a core width, spaced headers, one at each end, an inlet face and an outlet face spaced from one another by a core depth, said heat exchangers being arranged in adjacency in the configuration of a polygonal solid with their inlet faces located radially inward of their outlet faces and with each header in substantial abutment with a header of one of the other heat exchangers to define an open center housing;

a radial fan within said housing and rotatable about an axis;

a front panel having an air inlet on said axis and abutting a corresponding one of said opposed sides of each said heat exchanger;

a rear panel abutting the others of said opposed sides of each of said heat exchangers and journaling said fan for rotation about said axis;

and characterized by the core width of one of said heat exchangers being greater than that of another of said heat exchangers such that one or both of said opposed sides of said one heat exchanger projects forwardly and/or rearwardly of a corresponding one or both of said opposed sides of said another heat exchanger, said one heat exchanger projecting forwardly of said air inlet of said front panel and said front panel including a beveled surface located between said air inlet and said one of said opposed sides of said one heat exchanger.

2. The cooling system of claim 1 wherein said one of said heat exchangers has a core depth that is different from the core depth of said another heat exchanger.

3. The cooling system of claim 2 wherein the core depth of said one heat exchanger is greater than the core depth of said another heat exchanger.

4. The cooling system of claim 1 wherein said configuration includes a top side defined by said one heat exchanger, said one heat exchanger being a charge air cooler.

5. The cooling system of claim 1 wherein said one of said opposed sides of said one heat exchanger is imperforate and defines part of said front panel.

6. The cooling system of claim 1 wherein one or both of said front and rear panels includes a bend extending respectively to said one or said both of said opposed sides of said one heat exchanger.

7. A cooling system for air cooling a plurality of at least two different heat exchange fluids comprising:

a plurality of at least three heat exchangers, each having a core with opposed ends, opposed sides extending between said ends and spaced from one another by a core width, spaced headers, one at each end, an inlet face and an outlet face spaced from one another by a core depth, said heat exchangers being arranged in adjacency in the configuration of a polygonal solid with their inlet faces located radially inward of their outlet faces and with each header in substantial abutment with a header of one of the other heat exchangers to define an open center housing;

a radial fan within said housing and rotatable about an axis;

a front panel having an air inlet on said axis and abutting a corresponding one of said opposed sides of each said heat exchanger;

a rear panel abutting the others of said opposed sides of each of said heat exchangers and journaling said fan for rotation about said axis;

and characterized by the core width of one of said heat exchangers being greater than that of another of said heat exchangers such that one or both of said opposed sides of said one heat exchanger projects forwardly and/or rearwardly of a corresponding one or both of said opposed sides of said another heat exchanger, said one opposed side of said one heat exchanger being adjacent said front panel and extending forwardly of said air inlet, said front panel having a beveled surface between said air inlet and said one opposed side of said one heat exchanger.

\* \* \* \* \*